3,442,879
SPRAY PROCESS FOR HYDROLYZING A
POLYMER LATEX
Kenneth Worden Saunders, Darien, and Michael Niall O'Connor, South Norwalk, Conn., assignors to American Cyanamid Company, Stamford, Conn., a corporation of Maine
No Drawing. Filed Sept. 17, 1964, Ser. No. 397,304
Int. Cl. C08g 27/16, 27/14
U.S. Cl. 260—86.1                                7 Claims

ABSTRACT OF THE DISCLOSURE

A process for hydrolyzing a polymer latex, said process comprising contacting (a) a first reactant comprising said latex, with (b) a second reactant comprising water and alkali and alcohol, said contacting including: (1) forming said latex into a fine spray of sufficiently small droplets to impart substantially complete and homogeneous hydrolysis when said reactants react, and (2) adding said spray to the second reactant, said second reactant being at elevated temperature and in an agitated state whereby said reactants react.

---

This invention relates to a process for hydrolyzing a polymer latex to obtain a soil redeposition inhibitor useful for preventing redeposition of soil onto fabrics, clothes, and the like, during cleaning operations such as washing, shampooing, laundering, and dry-cleaning. More particularly, this invention relates to a method of hydrolyzing a polymer latex to obtain a hydrolyzed polymer having a substantially linear chain, containing relative molar ratios of hydroxyl substituents to carboxylic acids substituents ranging from about 30:70 to about 99:1. Although the hydrocarbon chain is believed to be predominantly linear, the exact degree of branching is as yet undetermined.

The phenomenon of soil redeposition is generally understood to refer to the redeposition of soil onto fabric, clothes, and the like, from the suspension of soil in a washing, shampooing, laundering, or dry-cleaning solution. While such solutions are generally capable of exerting a "soil suspending action," certain factors influence and control the redeposition of solid soil onto fabrices, clothes, and the like, and such factors are generally considered to be similar to those which influence removal of the soil. Thus, the chemical composition of the fabrics, clothes, and the like, and the composition of the washing, shampooing, laundering, and dry-cleaning solution are thought to be important. Further, whether soaps or synthetic detergents are utilized influences soil suspension or redeposition prevention. Similarly, the temperature, time and amount of detergent present effect redeposition just as they effect detergency.

The successful forming of a hydrolyzed copolymer employed in the process of this invention, whereby the hydrolyzed polymer has properties which make it effective as a soil anti-redeposition agent, has been found to involve many critical aspects. If particular procedures are not followed, the process in some cases may be frustrated by difficulties such as coagulation. In other situations, a hydrolyzed polymer may be obtained, but the hydrolyzed polymer is relatively ineffective as a soil anti-redeposition agent, and in fact may have become a scavenger. Under these conditions, it is believed that an unacceptable hydrolyzed polymer product is obtained which is either incompletely hydrolyzed, or of heterogeneous particle size, or mixed with coagulant, or combinations of these, for example.

Another problem in this invention has been to produce an active agent at a sufficiently high concentration level within a reasonable time to achieve acceptable commercial processing costs.

In addition to these limitations, the process technique must be capable of scaling up to a plant size reactor.

A typical example of a hydrolyzed polymer which is unsuitable for use as an anti-redeposition agent, is a polymer successfully hydrolyzed by visual appearance but where the hydrolysis took place in water containing the alkali caustic in an amount below a particular critical minimum. The resulting product of hydrolyzed polymer was not completely soluble in water and therefore was not a suitable anti-soil redeposition agent. Another typical problem encountered prior to applicants' invention arose from the attempt to bring about hydrolysis by the mixing of aqueous alkali solution with the polymer latex whereby the polymer coagulated.

Another problem arises if the hydrolyzing reactant is added to the polymer latex instead of adding the latex reactant to the hydrolyzing reactant. If the hydrolyzing reactant is added to the latex prior to applicants' invention, coagulation is probable.

Another problem is the means employed for adding the hydrolyzing reactant to the latex.

Another problem, related to a problem mentioned above, that is, the concentration or loading of hydrolyzed polymer produced during a single run of the process, arises from the fact that prior to applicants' invention coagulation becomes increasingly probable as the hydrolyzing reactant and the latex reactant are brought together in increasingly larger amounts within a reasonable time period. Therefore, prior to applicants' invention, to prevent coagulation, if hydrolyzing reactant was in a slow manner added to the latex, only a short addition time period elapsed before the ionic concentration became high enough to cause the latex to coagulate and agitation became impossible.

It has been found that if alcohol were added to the hydrolyzing reactant, that coagulation would be less probable during the addition of the latex reactant. However, alcohol increases the cost, complicates the process by the addition of another variable and possible reactant, and also if the alcohol is used in excess of a particular minimum, it appears to prevent complete hydrolysis and substantially decreases anti-soil redeposition properties of the hydrolyzed copolymer. For example, when methanol is employed as a part of the hydrolyzing reactant, the possibility is increased of obtaining an incompletely hydrolyzed polymer which is not sufficiently soluble in water, and therefore unsuited for use as an anti-soil redeposition agent.

Another typical problem which arises upon the addition of latex to the hydrolyzing reactant, is the formation of small conglomerates of latex particles which may undergo only partial hydrolysis on the exterior surface, thereby forming a surface film whereby there is slow diffusion of alkali through the film into the interior portion rendering heterogeneous hydrolysis, and whereby complete hydrolysis within a reasonable period is completely frustrated; as a result of the above mechanism, including the slow hydrolysis, further coagulation proceeds to a degree that agitation is no longer feasible.

The above-discussed problems are merely typical of the possible complications involved in a process for hydrolyzing the latex polymer of this invention in a manner whereby an operable and commercially feasible soil anti-redeposition agent is obtained.

An object of this invention is to hydrolyze the latex polymer by a process whereby the above problems are substantially overcome.

More particularly, the objects of this invention include obtaining a hydrolyzed copolymer suitable to be employed as a soil anti-redeposition agent, obtaining a higher loading, decreasing the required amount of alcohol, increasing the degree of complete and homogeneous hydrolysis, increasing the rate of hydrolysis, and decreasing the rate of coagulation.

Other objects become apparent to the ordinary artisan in the light of the preceding and following disclosure.

In accordance with the present invention, it has been discovered that the objects of this invention are achieved by employing a means, such as a spray nozzle, for producing a spray or a fog of either the hydrolyzing reactant or the latex reactant, and adding the spray or fog to the other reactant. Thereby, increasingly superior results and decreasing tendencies of coagulation are obtained, whereby a superior soil anti-redeposition agent is obtained, if other critical requirements are adhered to. Such requirements include employing the alkali in an amount of about 110% of theory, employing an alcohol:water solution of up to about 60% alcohol, preferably less, agitating the reactant to which the spray is being added, employing the alcohol in a ratio below a particular minimum of about 6:1 of alcohol (methanol or ethanol, for example) to copolymer latex solids, employing a latex of up to about 60% solids, normally about 45% to about 55% solids, and employing latex copolymer reactant to form the spray or fog and adding the latex spray to the hydrolyzing reactant. The preferred alcohol:water ratio is about 1:3.

The alkaline hydrolyzed polymers of this invention are derived from (a) vinyl acetate and (b) a lower alkyl acrylate such as methyl acrylate, ethyl acrylate, propyl acrylate, and equivalents thereof. The vinyl acetate monomer and the acrylate monomer respectively, are preferably present in the polymer in a ratio of between about 60 to 90 vinyl acetate, to between about 40 to 10 acrylate, respectively.

However, it is also within the scope of this invention to hydrolyze polyvinyl acetate to obtain polyvinyl alcohol.

A preferred method for preparing the preferred substantially homogeneous linear hydrocarbon chain polymers resides in the substantially instantaneous copolymerization of vinyl acetate and the requisite amount of either a carboxylic acid monomer as, for example, acrylic or methacrylic acid or a carboxylic acid derivative which on hydrolysis, yields a carboxylic acid salt. Illustrative carboxylic acid derivatives which are contemplated herein are, for example, acrylonitrile, acrylamide, acrylate alkyl esters and methacrylate alkyl esters.

The process for making the polymer may be by either of two typical and conventional methods, for example. In one method, monomers are "emulsified" and added to a reaction mixture of water containing a conventional acidic polymerization initiator such as sodium sulfite and ammonium persulfate. By a second method, a "monomer mixture" is added to the above with a catalyst present. The sodium sulfite, for example, serves as the reductant for the redox catalyst system and also acts a a buffer to control the pH in the polymerization kettle.

By both the "emulsified" process and the "mixture" process, the copolymerization reaction produces a latex, which is subsequently hydrolyzed typically by a strong base (such as sodium hydroxide), at a pH of about 12 or 13. By hydrolyzing in the presence of the strong base, the acetate and acrylate substituents are converted to alcohol substituents, the carboxylate substituents, to the alkaline carboxylic salt substituents, or substituent mixtures thereof. Upon completion of the hydrolysis, the pH is normally adjusted to about 8.5 to about 9.5. The monomers are preferably reacted at about 73° C. to about 75° C., and subsequently heated at about 75° C. to about 95° C. to insure complete polymerization. By either method, in preparing the polymer, the monomers, illustratively vinyl acetate and ethyl acrylate, are introduced in molar amounts which will correspond to the hydroxyl and carboxylate ratios in the vinyl alkaline hydrolyzed polymer. Preferably the hydrolyzed polymers may be characterized as being of relatively high molar weight. Normally, the polymers are characterized as having specific viscosities of from about 0.2 to about 4.0 at 30° C. when measured at a concentration of about 0.5 gram per 100 ml. in a one normal sodium chloride solution.

After the formation of the polymer, it will be subjected to the alkaline hydrolysis of this invention. The alkaline material typically is an alkaline metal oxide or hydroxide such as sodium, potassium, and ammonium hydroxide. Alkaline hydrolysis of the polymer is normally indicated as being complete when the hydrolyzed solution becomes a smooth, slightly opaque, substantially homogeneous solution and when it may be readily diluted with water to give about a 1% (or less) water-white solution free of fish-eyes.

The removal of the hydrolyzed polymer, may if desired, be accomplished by conventional means which include precipitation by the addition of alcohol, evaporation, drum-drying, spray drying, etc.

In order to obtain a hydrolyzed polymer of this invention, it is necessary that the spray or fog be formed into droplets which are sufficiently small so as to render the desired results. The hydrolyzed polymer of desired results is a product which renders at least minimal soil anti-redeposition properties. It has been found, however, that the water solubility can be related to the degree of hydrolysis of the polymer. Thus, the desired hydrolyzed polymer product is believed to be one which is substantially completely hydrolyzed and substantially homogeneously hydrolyzed, i.e., not heterogeneously hydrolyzed. Advantageously, the hydrolyzed polymers of this invention are water soluble over the entire range of hydroxyl to carboxylate mole ratio.

The mechanism whereby employment of a fine spray or fog obtains the desired hydrolyzed polymer having soil anti-redeposition properties is believed to involve three basic phenomena: (1) the rate at which the latex polymer solid forms a solution; (2) the rate at which solid polymer, which is not in solution, forms a precipitate of coagulate, i.e., the rate of coagulation; and (3) the rate at which the dissolved polymer hydrolyzes to form the soil anti-redeposition agent. It is believed that applicants' invention arises from the phenomenon that (1) the rates of forming a solution of polymer particles in the hydrolysis media and of hydrolysis of the dissolved particles exceed (2) the rate of coagulation. The alcohol: water ratio normally must be low enough to facilitate hydrolysis, yet must be high enough to obtain this desired degree of solubility of the polymer particles by virtue of the alcohol being present in a sufficiently large amount. Similarly, the polymer in solution employed must be present in an amount (loading) sufficiently large to be practical for hydrolyzed polymer production on a commercial scale.

It was determined by the applicants that satisfactory hydrolysis may be obtained to a greater degree, (1) when the rate of intermixing the hydrolyzing reactant and the latex polymer is decreased, i.e., the slower the addition, the better the hydrolysis, and (2) when smaller particle sizes of the incoming drops are used, i.e., the smaller the drops, the better the hydrolysis. By employing sufficiently small incoming droplets the rate of substantially complete hydrolysis is thereby increased whereby there is little or no tendency to coagulate, and whereby the process of obtaining a final product of satisfactorily hydrolyzed polymer having the desired degree of soil anti-redeposition properties is obtained within a time period which is practical for commercial production. It is believed that the reason that the decreased size of the incoming droplets gives the desired results, is because the more surface area that is provided, and the greater the dispersion of the droplets, accordingly the greater the rate of solution of polymer particles and, therefore, the greater the opportunity for hydrolysis to take place, whereby the rate of hydrolysis exceeds the rate of coagulation.

As the size of the droplets decreases, it has been found that the rate of substantially complete hydrolysis increases and that the resulting product thereby has a lesser tendency to contain globules ("fish-eyes," i.e., heterogeneous hydrolysis) and has a lesser tendency to coagulate. Therefore, it is advantageous to decrease the droplet-size to that obtainable in a fine spray, or mist, or fog. Preferably, the droplet-size is at least as small as obtainable from a capillary tube.

It is within the scope of this invention to add the hydrolyzing reactant in the form of a spray or fog, to a polymer latex to hydrolyze. However, it has been unexpectedly found that the tendency to coagulate is substantially decreased by the addition of an aqueous latex polymer in the form of spray or mist or fog to the hydrolyzing reactant, and this is the preferred embodiment.

Agitating the hydrolyzing reactant while spraying the latex polymer onto the surface of the hydrolyzing reactant is critical to obtain the "preferred" hydrolyzed product, and the "preferred" accelerated rate of hydrolysis.

A major reason for the use of alcohol-water combinations as a solvent for the alkali in the hydrolysis is because, as discussed above, this solution virtually eliminates the danger of polymer coagulation during hydrolysis in laboratory small-scale runs. The following Table I illustrates the results of experiments which were conducted, and establishes that not all ratios of alcohol:water are operable, or alternatively do not produce a hydrolyzed polymer having the required soil anti-redeposition properties.

TABLE I.—ALCOHOL-WATER HYDROLYSIS OF POLYMER
[Caustic: 110% of Theory]

| Alc./H₂O Ratio | Hydrolysis | | Sp. Visc. 0.5% | SAR Rating |
| --- | --- | --- | --- | --- |
| | Time (hr.) | T. (° C.) | | |
| 3.71 | 16 | 30 | (¹) | −9 |
| 2.6/1 | 1 | 73 | 5.2 | −10 |
| 2.6/1 | 2 | 73 | 4.4 | −9 |
| 2.6/1 | 4 | 73 | 4.3 | −5 |
| 2.6/1 | 6 | 73 | 3.8 | −2 |
| 2.4/1 | 1 | 75 | 4.4 | −7 |
| 2.4/1 | 2 | 75 | 3.1 | −3 |
| 2.4/1 | 4 | 75 | 3.6 | −2 |
| 2.4/1 | 6 | 75 | 3.3 | −2 |
| 1.3/1 | 1 | 77 | 2.7 | −1 |
| 1.3/1 | 2 | 77 | 3.6 | −1 |
| 1.3/1 | 4 | 77 | 3.7 | 0 |
| 1.3/1 | 6 | 77 | 3.4 | 0 |
| 1.3/1 | 8 | 77 | 3.2 | +1 |

¹ Not completely soluble.

In the above Table I, the SAR rating is an arbitrary comparison (a comparison of fabric reflectances) of the soil anti-redeposition properties of the hydrolyzed polymer of this invention as compared to the soil anti-redeposition characteristics of carboxymethyl cellulose (CMC), under identical conditions, the latter being a well-known soil anti-redeposition agent suitable to serve as a basis for comparison. A zero (0) rating means that the hydrolyzed polymer has substantially equivalent anti-soil redeposition properties as CMC. "Minus" is inferior and "plus" is superior to CMC.

The above Table I establishes that large amounts of alcohol (methanol), such as alcohol:water ratio of 2.6–3.7:1 fails to give a hydrolyzed polymer having desired characteristics. Either the polymer becomes not entirely soluble, or if soluble, does not have the required degree of soil anti-redeposition properties. It should be further noted that the Table I illustrates an SAR (soil anti-redeposition) rating of minus one (−1) at the end of merely one hour, for a ratio of 1.3:1 of alcohol:water which is superior to the degree of hydrolysis at six hours for ratios such as 2.6:1, or 2.4:1. The SAR rating for the 1.3:1 ratio at four hours has proceeded to a value of "0" and at eight hours has proceeded to a "+1" value.

It was found by the applicants that solid latex polymer, prior to hydrolysis, has a very low solubility in the hydrolyzing reactant containing only alkali and water. It was also found that if hydrolysis could be accomplished, the hydrolyzed copolymer was highly soluble in the hydrolyzing reactant containing solely water and the alkali. By employing alcohol therewith, it was found that the solid polymer in the latex is highly soluble in the alcohol, but that when hydrolysis has been achieved, the resulting hydrolyzed copolymer is substantially insoluble in alcohol. It was further found that when an intermediate wide range of ratios of alcohol:water was used, the rate of formation of a solution of the polymer particles in the latex was increased and that within this range the hydrolyzed polymer did not precipitate out. By employing an alkaline hydrolyzing medium of intermediate concentrations of alcohol and water, applicants unexpectedly found that the rate of formation of polymer solution substantially increases, whereby the tendency to coagulate is thereby substantially decreased. By adding the latex polymer in the form of a spray, or mist or fog, applicants unexpectedly found that the rate of hydrolysis was increased to a degree sufficient that little or not alcohol is necessary in the hydrolyzing alkali reactant. Hydrolysis in the absence of alcohol has the advantage of avoiding the problems and difficulties discussed above which arise from the presence of alcohol in the hydrolyzing reactant. In the preferred embodiment, however, to further achieve objects discussed above, to promote the degree of hydrolysis whereby a soil anti-redeposition polymer results and having the desired soil anti-redeposition characteristics, it is still desirable to employ a small but minor amount of alcohol whereby the solubility of the unhydrolyzed polymer is increased in the hydrolyzing reactant. By employing the combination of (1) the spray technique, (2) alkaline alcohol-water media for hydrolysis, unexpectedly superior and consistent results are obtained whereby coagulation probability is eliminated and whereby the hydrolyzed product has the desired high soil anti-redeposition properties.

In the present invention, methanol is the preferred alcohol, although ethanol also gives highly desirable results and although it is possible to use mixtures of two or more alcohols. Equivalent alcohols are usable.

Thus, the process is perfected to a higher degree when the latex polymer solution is sprayed into the hydrolyzing alkali reactant containing a small amount of alcohol.

As discussed above, the amount of alkali employed in the hydrolyzing reactant is critical in determining whether or not the resulting hydrolyzed copolymer has or does not have soil anti-redeposition properties. It was found that while the polymer could be hydrolyzed successfully in water with only 90% of theoretical caustic, very frequently the polymer was not completely soluble and therefore was not a suitable soil anti-redeposition agent. The following Table II discloses the experimental results of aqueous caustic hydrolysis of the copolymer.

TABLE II.—AQUEOUS CAUSTIC HYDROLYSIS OF POLYMER

| Polymer Lot | Hydrolysis | | Specific Visc. | SAR Rating |
| --- | --- | --- | --- | --- |
| | Time (hr.) | Temp. (° C.) | | |
| Low Caustic (90% of Theory) | | | | |
| B | 6 | 80–90 | (¹) | −8 |
| C | 6 | 80–90 | (¹) | −6 |
| D | 6 | 80–90 | (¹) | −6 |
| High Caustic (110% of Theory) | | | | |
| A | 16 | 80–90 | 1.4 | −2 |
| B | 4 | 80–90 | 1.4 | −1 |
| C | 4 | 80–90 | 1.8 | +2 |
| D | 4 | 80–90 | 1.7 | +2 |

¹ Not completely soluble in water.

From the above Table II, it is clear that in order to consistently get a hydrolyzed product which is substantially completely soluble, and which has the desired anti-soil redeposition properties it is necessary to use a relatively high caustic concentration, about 90% of theory and preferably about 110% of theory.

It is therefore apparent that applicants' invention becomes further perfected by additionally employing the phenomenon of unexpectedly superior soil anti-redeposition results from the utilization of about 110% of theory of caustic in the hydrolyzing alkali solution, in combination with adding the latex polymer to the hydrolyzing alkali reactant, the adding of the latex copolymer solution being by means of the spray, or mist or fog method, and the hydrolyzing alkali solution containing a small amount of alcohol preferably in a ratio of about 1:3 of alcohol: water.

Prior to applicants' spray hydrolysis method, it was essential to continuously agitate the solution to which the spray was being added. Although agitation is not as critical in the present method employing the spray technique because of the high rate of hydrolysis achieved thereby, in order to consistently and reliably prevent any tendency toward coagulation and to obtain a hydrolyzed product having the desired solubility and the desired soil anti-redeposition properties, it remains important that the solution to which the spray is being added be agitated. Therefore, in the preferred embodiment of applicants' process, the alcohol:water solution of alkali hydrolyzing reactant is substantially continuously agitated during the addition of the spray, or mist or fog of the latex polymer.

In order to hydrolyze the latex with a minimal tendency to coagulate, and with a minimal use of alcohol, the latex normally must be sprayed onto a hot aqueous (methanolic) alcoholic solution of sodium hydroxide, for example, while controlling at the reflux temperature of the alcohol. The spray must hit the swirling liquid with the very minimum of latex build-up on the agitator shaft or side-walls. Failure to follow this procedure will cause an increase in the tendency to coagulate, and an increase in the tendency toward incomplete hydrolysis and incomplete solution, whereby fish-eyes will appear in the final hydrolyzed product, and furthermore, the difficulty of cleaning the hydrolyzing kettle will be increased.

Temperature during hydrolysis was found to be not noticeably related to poor or better soil anti-redeposition value.

In order to illustrate further the present invention, the following examples are given primarily by a way of illustration. No specific details or enumerations contained therein should be construed as limitations on the present invention except insofar as they appear in the appended claims.

All parts and percentages are by weight unless otherwise specifically designated.

EXAMPLE 1

The copolymer latex of about 28% solids was prepared. Sodium hydroxide in the amount of 141.8 grams was intermixed with 612 grams of water and 9.8 grams of sodium acetate. Next, hydrolysis was attempted by the addition of the sodium hydroxide solution to 1224 gross of latex. The sodium hydroxide was slowly added to the agitated latex. At first, hydrolysis went smoothly. Then the entire batch coagulated to form coagulated polymer. The coagulated polymer was chopped and blended with sodium hydroxide. It was then heated to a temperature between 80 and 100° C. for about four (4) hours. At the end of this time the batch was only partially hydrolyzed with many particles remaining. 20% more caustic, i.e., 28 grams of sodium hydroxide, and 100 milliliters of water was added to this, and heated for an additional three (3) hours, at the end of which time hydrolysis of the polymer appeared to be normal and in solution at a pH 8.

The above Example 1, serves to illustrate the real problem of the possibility of coagulation when hydrolysis of the copolymer latex is attempted. It might be noted that in this example, the alkali sodium hydroxide was added to the copolymer latex.

EXAMPLE 2

Typical polymerization for 45% solids latex

Pot charge:
```
    Sodium acetate _____g__  14.00
    Sodium bicarbonate _____g__  14.00
    Emulsifier (75%); (Aerosol MA) _____g__  93.45
    Emulsifier (80%); (Aerosol OT) _____g__  87.50
    Deionized water _____ml_  6650
Initiator solution:
    Ammonium persulfate _____g__  18.2
    Deionized water _____ml_  1750
Monomer solution:
    Vinyl acetate _____g__  4900
    Ethyl acrylate _____g__  2100
```

A 22 liter flask fitted with condenser, stirrer (18.2 cm. blade), 2 addition funnels and a gas inlet tube was charged and heated to 80° C. while purging with nitrogen. The flask was cooled to 72° C.

To the flask was then added 10% of the initiator solution (175 ml.). After 5 minutes the monomer and catalyst additions were started simultaneously at a rate such that all the monomers and all but 10% of the initiator solution were added in 2 hours. The remaining 10% of the initiator was added 5 minutes after the monomer addition was complete.

During the addition the temperature was maintained at 70-75° C. Agitation was maintained at 125 to 140 r.p.m.

After the final initiator solution was added the temperature was raised to 85° C. for 20 minutes to complete the polymerization. At the end of this period the nitrogen flow was stopped and the contents of the flask cooled to room temperature and filtered through a stainless steel cloth to remove coagulum. The nitrogen flow is stopped when the cooling begins to minimize evaporation and formation of scum or coagulum on the surface.

EXAMPLE 3

Typical spray hydrolysis.—Spray hydrolysis of 45% solids latex

Pot charge:                              G.
```
    Sodium hydroxide (about 110% of theory) __   988
    Deionized water _____  2500
    Methanol _____  1556
    Latex _____  4500
```

A 22 liter flask equipped with a high torque stirrer, a reflux condenser, thermometer and spray nozzle was charged with sodium hydroxide, water and methanol.

The liquid inlet to the spray nozzle was connected through a tee to a water reservoir and a reservoir containing the latex. A water connection was necessary for flushing out alcohol in or on the nozzle tip before starting to feed the latex and for flushing the nozzle if latex flow was interrupted during the addition.

After heating the flask and contents to 75° C., the nozzle was flushed with water and latex was sprayed in during 1½ hours while controlling the flask temperature at about 75° C.

After all the latex was added, the flask was heated at reflux (about 83° C.) for 1 hour.

The condenser was then changed to allow simple distillation of the alcohols. Distillation was continued until the flask temperature reached 95° C.

When the recovery of alcohol was essentially complete, the distillation was stopped and the flask was allowed to cool to 50-80° C.

The pH of the contents was adjusted to pH 9-9.5 using glacial acetic acid.

Although not critical, the contents were diluted to 10-11% active SAR agent to reduce the viscosity and the pH was rechecked and readjusted as necessary. The product was used as prepared above or it could be dried by conventional means such as, spray drying, drum drying or vacuum-tray drying.

In Example 3, above, a commercial spray nozzle was employed (Spraying Systems Co., nozzle 1:8-JBC-SS). Nitrogen at 7-10 p.s.i.g. was employed as the atomizer.

Although the illustrations and disclosure are representative of the applicants' invention as further illustrated in Example 3, the invention should not be construed as limited thereby nor as limited to the the specific composition concentrations, etc., utilized for purposes of illustration; i.e., the invention includes the use of the equivalents. It is to be understood that any suitable changes, modifications, and variations may be made without departing from the scope of this invention, as defined in the appended claims.

In the claims:

1. A process for hydrolyzing a polymer latex to obtain a hydrolyzed polymer having a substantially linear chain, containing relative molar ratios of hydroxyl substituents to carboxylic acid substituents ranging from about 30:70 to about 99:1 by reacting an aqueous polymer latex solution with an aqueous hydrolyzing solution containing alcohol and alkali, the process comprising, forming a hydrolyzing solution of up to 60% alcohol in water and containing at least a theoretical amount of alkali, maintaining said hydrolyzing solution at an elevated temperature and in an agitated state, and spraying said latex solution onto the surface of said hydrolyzing solution, said latex solution having up to 60% solids content, and said spray being in sufficiently fine droplets to obtain substantially complete and homogeneous hydrolysis.

2. The process of claim 1 wherein said latex is formed from a vinyl acetate monomer and a lower alkyl acrylate monomer in a ratio of 60:90 to 40:10 respectively.

3. The process of claim 1 wherein said latex solution contains from about 45 to 55% latex solids.

4. The process of claim 1 wherein said hydrolyzing solution has a ratio of about 1:3 of alcohol to water.

5. The process of claim 1 wherein said alcohol is a lower alkanol.

6. The process of claim 1 wherein said alkali is used in an amount of about 110% of the theoretical amount.

7. The process of claim 1 wherein said alkali is sodium hydroxide.

References Cited

UNITED STATES PATENTS

| | | | |
|---|---|---|---|
| 2,467,774 | 4/1949 | Plambeck | 260—86 |
| 3,186,803 | 6/1965 | Akaboshi et al. | 23—285 |

JOSEPH L. SCHOFER, *Primary Examiner.*

STANFORD M. LEVIN, *Assistant Examiner.*

U.S. Cl. X.R.

260—85.5, 85.7, 91.3